No. 828,129. PATENTED AUG. 7, 1906.
L. W. LAYE, J. H. PHILLIPS & J. BEVAN.
NUT LOCK.
APPLICATION FILED FEB. 17, 1906.
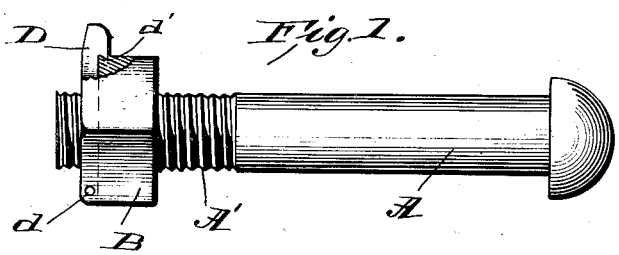
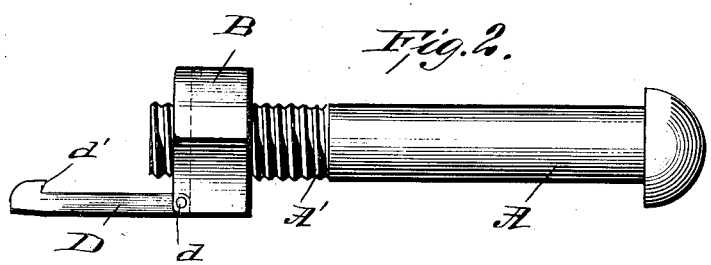
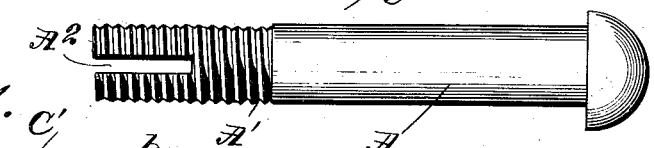
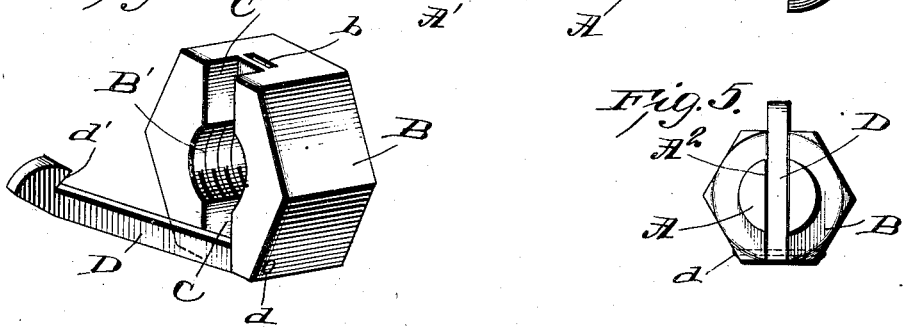
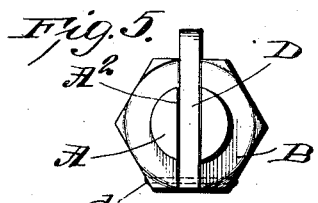
WITNESSES:
INVENTORS
LOUIS W. LAYE
JOHN H. PHILLIPS
JOHN BEVAN
BY
ATTORNEYS

UNITED STATES PATENT OFFICE.

LOUIS W. LAYE, JOHN H. PHILLIPS, AND JOHN BEVAN, OF HAVRE DE GRACE, MARYLAND; SAID LAYE ASSIGNOR TO SAID PHILLIPS AND BEVAN.

NUT-LOCK.

No. 828,129.　　　Specification of Letters Patent.　　　Patented Aug. 7, 1906.

Application filed February 17, 1906. Serial No. 301,608.

*To all whom it may concern:*

Be it known that we, LOUIS W. LAYE, a citizen of the United States, and JOHN H. PHILLIPS and JOHN BEVAN, subjects of the King of Great Britain, all residents of Havre de Grace, in the county of Harford and State of Maryland, have made certain new and useful Improvements in Nut-Locks, of which the following is a specification.

This invention is an improvement in nut-locks; and it consists in certain novel constructions and combinations of parts, as will be hereinafter described and claimed.

In the drawings, Figure 1 is a side view, partly in section, of a nut-lock embodying my invention with the locking-bar in locked position. Fig. 2 is a side view showing the locking-bar released. Fig. 3 is a detail side view of the bolt. Fig. 4 is a detail perspective view of the nut, and Fig. 5 is an end view of the bolt and nut with the locking-bar in locked position.

The bolt A is threaded at A' to receive the nut B and is slotted longitudinally at $A^2$ from its threaded end or point. The nut B is threaded at B' to fit on the bolt and is provided in its outer end with a transverse channel whose sections C and C' communicate at their inner ends with the threaded opening B' through the nut, and in the side of the nut B adjacent to the inner end of the channel C' we form a groove or socket $b$, in which the hooked end D' of the locking-bar D engages, so the locking-bar and nut will be interlocked when the parts are in the position shown in Fig. 1. This locking-bar D is pivoted at $d$ at one end to the nut and interlocks at its other or free end with the nut when in locked position, so the locking-bar cannot jar out of place or be released accidentally or by children or triflers after it has been once locked. This locking-bar D is made of such width as to fit snugly within the transverse channel in the end of the nut and of such thickness that it will when in locked position coincide at its outer edge with the outer end of the nut, as shown in Fig. 1 of the drawings.

When opened, the locking-bar D will not project beyond the side of the nut B and will afford no obstruction to the application of a wrench in applying or removing the nut.

To provide for interlocking the bar with the nut, we preferably form the bar D at its outer swinging end with a hook $d'$, the point of which when the bar is forced to locked position by a sharp blow with a hammer or other instrument enters the notch or groove $b$ and secures the bar in place, so it cannot be easily released. When desired, the projecting end of the bar may be struck with a hammer, wrench, or other tool and released.

In locked position the bar crosses the slot $A^2$ and prevents any turning of the nut in either direction.

Having thus described our invention, what we claim as new, and desire to secure by Letters Patent, is—

1. The combination substantially as herein described, of the bolt, slotted longitudinally from its point end, the nut having a threaded opening to fit said bolt and provided with a transverse groove or channel across its outer end with its end sections intersecting the threaded opening in the nut and provided in its outer face adjacent to the inner end of one of the channel-sections with a socket, and a locking-bar pivoted at one end to the nut within the channel at one end of the latter and having its other or free end hooked to engage in the socket in the outer face of the nut, substantially as and for the purposes set forth.

2. A nut having a transverse channel in its outer end and a locking-bar operating in such channel and pivoted at one end and extending thence across the bolt-hole in the nut and provided at its free end with a hook to interlock with the nut on the opposite side of the bolt-hole from the pivoted end of the bar in the locked position of said bar, substantially as set forth.

3. The combination with the nut having a threaded opening and provided in its outer end with a transverse channel whose sections communicate at their inner ends with said threaded opening, and also provided in its outer face adjacent to its transverse channel with a socket, and a locking-bar pivoted at one end and hooked at its other end for interlocking engagement in said socket, substantially as set forth.

LOUIS W. LAYE.
　　　　　JOHN H. PHILLIPS.
　　　　　JOHN BEVAN.

Witnesses:
　THOS. O'DONNELL,
　MARTIN S. ROBINSON.